United States Patent
Connell et al.

(10) Patent No.: US 8,676,863 B1
(45) Date of Patent: Mar. 18, 2014

(54) MAINTAINING A RELATIONAL DATABASE AND ITS SCHEMA IN RESPONSE TO A STREAM OF XML MESSAGES BASED ON ONE OR MORE ARBITRARY AND EVOLVING XML SCHEMAS

(75) Inventors: Kevin Patrick Connell, Seattle, WA (US); Andrew Mark Winterbauer, Issaquah, WA (US); Kari Danielle Wittgens, Edgwood, WA (US); Jason Alex Haley, Seattle, WA (US)

(73) Assignee: Liberty Mutual Insurance Company, Boston, MA (US)

( * ) Notice: Subject to any disclaimer, the term of this patent is extended or adjusted under 35 U.S.C. 154(b) by 812 days.

(21) Appl. No.: 12/211,047

(22) Filed: Sep. 15, 2008

(51) Int. Cl.
  *G06F 7/00* (2006.01)
  *G06F 17/30* (2006.01)

(52) U.S. Cl.
  USPC .......................................................... 707/804

(58) Field of Classification Search
  USPC .............. 707/804, 809, 803, 802, 790, 999.1, 707/999.101, 999.102
  See application file for complete search history.

(56) References Cited

U.S. PATENT DOCUMENTS

| | | | |
|---|---|---|---|
| 7,043,487 B2 * | 5/2006 | Krishnamurthy et al. | 707/804 |
| 2002/0123993 A1 * | 9/2002 | Chau et al. | 707/5 |
| 2003/0101194 A1 * | 5/2003 | Rys et al. | 707/101 |
| 2004/0128296 A1 * | 7/2004 | Krishnamurthy et al. | 707/100 |
| 2005/0228818 A1 * | 10/2005 | Murthy et al. | 707/102 |
| 2006/0064428 A1 * | 3/2006 | Colaco et al. | 707/101 |
| 2007/0016610 A1 * | 1/2007 | Cohen et al. | 707/104.1 |
| 2008/0059404 A1 * | 3/2008 | Jonker et al. | 707/2 |
| 2009/0030926 A1 * | 1/2009 | Aharoni et al. | 707/102 |

* cited by examiner

*Primary Examiner* — James Trujillo
*Assistant Examiner* — Jeffrey Chang
(74) *Attorney, Agent, or Firm* — Alston & Bird LLP

(57) ABSTRACT

A facility for representing in a relational database informational content of the series of tag-language messages is described. The facility reads an arbitrary number of the tags contained by the series of messages. For each read tag, the facility determines a path for the tag, the name of a relational table assigned to the path, values specified for the tag and/or attributes of the tag, in the name of columns of relational tables assigned to the tag and/or tag attribute values. After doing this processing, the facility updates the relational database so that and it includes all of the assigned relational tables and a relational table columns, and populates the value specified for the tags and/or attributes of tags to the relational database.

5 Claims, 23 Drawing Sheets

FIG. 7

| Element Id/Row Id | Depth | Foreign Key Id | Table Name | Parent Table Name |
|---|---|---|---|---|
| 1 | 1 |  | CUSTOMER |  |
| 2 | 2 | 1 | NAME | CUSTOMER |
| 4 | 2 | 1 | TXNS | CUSTOMER |
| 5 | 3 | 4 | TXN | TXNS |
| 6 | 4 | 5 | TXNS | TXN |
| 8 | 4 | 5 | TXNS | TXN |

Element Metadata List 700
701 702 703 704 705
711 712 713 714 715 716

| Table Name | XPath | Column Name | Parent Table Name |
|---|---|---|---|
| CUSTOMER | /CUSTOMER | | |
| NAME | /CUSTOMER/NAME | | CUSTOMER |
| NAME | /CUSTOMER/NAME | NAME | CUSTOMER |
| TXNS | /CUSTOMER/TXNS | | CUSTOMER |
| TXNS | /CUSTOMER/TXNS/TXNTYPE_ATTR | TXNTYPE_ATTR | CUSTOMER |
| TXN | /CUSTOMER/TXNS/TXN | | TXNS |
| TXN | /CUSTOMER/TXNS/TXN/TIMESTAMP_ATTR | TIMESTAMP_ATTR | TXNS |
| TXNS_1 | /CUSTOMER/TXNS/TXN/TXNS | | TXN |
| TXNS_1 | /CUSTOMER/TXNS/TXN/TXNS | TXNS | TXN |

CUSTOMER Table — 1000

| CUSTOMER_ID |
|---|
| 1 |

FIG. 11

NAME Table — 1100

| CUSTOMER_ID | NAME_ID | NAME |
|---|---|---|
| 1 | 2 | Ken Smith |

FIG. 12

TXNS Table — 1200

| CUSTOMER_ID | TXNS_ID | TXNTYPE_ATTR |
|---|---|---|
| 1 | 4 | Retail |

FIG. 13

TXN Table 1300

| TXNS_ID | TXN_ID | TIMESTAMP_ATTR |
|---|---|---|
| 4 | 5 | 12/12/12 01:01:01 |

FIG. 14

TXNS_1 Table 1400

| TXN_ID | TXNS_1_ID | TXNS |
|---|---|---|
| 5 | 6 | Milk |
| 5 | 8 | Cookies — 1412 |

FIG. 15

Query Results

| TXNS_1_ID | TXNS |
|---|---|
| 8 | Cookies |

FIG. 16

Element Metadata List — 1600

| Element Id/Row Id | Depth | Foreign Key Id | Table Name | Parent Table Name |
|---|---|---|---|---|
| 1 | 1 | | CUSTOMER | |
| 2 | 2 | 1 | NAME | CUSTOMER |
| 4 | 2 | 1 | TXNS | CUSTOMER |
| 5 | 3 | 4 | TXN | TXNS |
| 6 | 4 | 5 | TXNS_1 | TXN |
| 8 | 4 | 5 | TXNS_1 | TXN |
| 10 | 1 | | CUSTOMER | |
| 11 | 2 | 10 | LOCATIONS | CUSTOMER |
| 13 | 2 | 10 | NAME | CUSTOMER |
| 15 | 2 | 10 | TXNS | CUSTOMER |
| 16 | 3 | 15 | TXN | TXNS |
| 17 | 4 | 16 | TXNS_1 | TXN |
| 19 | 4 | 16 | TXNS_1 | TXN |
| 20 | 5 | 19 | ITEM | TXNS_1 |
| 22 | 2 | 10 | TXNS | CUSTOMER |
| 23 | 3 | 22 | TXN | TXNS |
| 24 | 4 | 23 | TXNS_1 | TXN |
| 26 | 4 | 23 | TXNS_1 | TXN |
| 27 | 5 | 26 | ITEM | TXNS_1 |

Rows labeled 1611–1629.

XML_PATH_MAP Table 1800

| Table Name | XPath | Column Name | Parent Table Name |
|---|---|---|---|
| CUSTOMER | /CUSTOMER | | |
| CUSTOMER | /CUSTOMER/CLUBMEMBERNUMBER_ATTR | CLUBMEMBERNUMBER_ATTR | CUSTOMER |
| NAME | /CUSTOMER/NAME | | CUSTOMER |
| NAME | /CUSTOMER/NAME | NAME | CUSTOMER |
| TXNS | /CUSTOMER/TXNS | | CUSTOMER |
| TXNS | /CUSTOMER/TXNS/TXN/TXNTYPE_ATTR | TXNTYPE_ATTR | CUSTOMER |
| TXNS | /CUSTOMER/TXNS/REGISTERNUMBER_ATTR | REGISTERNUMBER_ATTR | CUSTOMER |
| TXN | /CUSTOMER/TXNS/TXN | | TXNS |
| TXN | /CUSTOMER/TXNS/TXN/TIMESTAMP_ATTR | TIMESTAMP_ATTR | TXNS |
| TXNS_1 | /CUSTOMER/TXNS/TXN/TXNS | TXNS | TXN |
| TXNS_1 | /CUSTOMER/TXNS/TXN/TXNS | | TXN |
| LOCATIONS | /CUSTOMER/LOCATIONS | | CUSTOMER |
| LOCATIONS | /CUSTOMER/LOCATIONS | LOCATIONS | CUSTOMER |
| ITEM | /CUSTOMER/TXNS/TXN/TXNS/ITEM | | TXNS_1 |
| ITEM | /CUSTOMER/TXNS/TXN/TXNS/ITEM | ITEM | TXNS_1 |

CUSTOMER Table 1900

| CUSTOMER_ID | CLUBMEMBERNUMBER_ATTR |
|---|---|
| 1 | |
| 10 | 999 |

LOCATIONS Table 2000

| CUSTOMER_ID | LOCATIONS_ID | LOCATIONS |
|---|---|---|
| 10 | 11 | Address1 |

*FIG. 20*

NAME Table 2100

| CUSTOMER_ID | NAME_ID | NAME |
|---|---|---|
| 1 | 2 | Ken Smith |
| 10 | 13 | Ken Smith |

TXNS Table 2200

| CUSTOMER_ID | TXNS_ID | TXNTYPE_ATTR | REGISTERNUMBER_ATTR |
|---|---|---|---|
| 1 | 4 | Retail | |
| 10 | 15 | Wholesale | 334 |
| 10 | 22 | Retail | 334 |

TXN Table 2300

| TXNS_ID | TXN_ID | TIMESTAMP_ATTR |
|---|---|---|
| 4 | 5 | 12/12/12 01:01:01 |
| 15 | 16 | 12/12/12 02:01:01 |
| 22 | 23 | 12/12/12 02:01:02 |

FIG. 24

TXNS_1 Table 2400

| TXN_ID | TXNS_1_ID | TXNS |
|---|---|---|
| 5 | 6 | Milk |
| 5 | 8 | Cookies |
| 16 | 17 | Beer |
| 16 | 19 | |
| 23 | 24 | Cookies |
| 23 | 26 | |

ITEM Table — 2500

| TXNS_1_ID | ITEM_ID | ITEM |
|---|---|---|
| 19 | 20 | Wine |
| 26 | 27 | Candy |

FIG. 26

Query Results — 2600

| TXNS_1_ID | TXNS |
|---|---|
| 8 | Cookies |
| 24 | Cookies — 2612 |

MAINTAINING A RELATIONAL DATABASE AND ITS SCHEMA IN RESPONSE TO A STREAM OF XML MESSAGES BASED ON ONE OR MORE ARBITRARY AND EVOLVING XML SCHEMAS

TECHNICAL FIELD

The described technology is directed to the field of data parsing, and, more particularly, to the field of discerning the structure of received information.

BACKGROUND

XML is a markup language that can be used to represent data organized in accordance with a schema that specifies an arbitrary hierarchical structure. In particular, the schema specifies a hierarchy of tags, each representing an element that is capable of having a value and/or values for attributes associated with the element.

It is typical for the designers of a distributed application to specify a schema for organizing the specific data that is used by the application. This schema is shared by all of the application's components. In order to exchange data between such components, a sending component uses its copy of the schema to generate an XML document, or "message" containing the data to be sent, organized using tags in a structure that is consistent with the schema. When the sending component sends the message to a receiving component, the receiving component uses its copy of the schema to understand the structure of the transmitted data, so that it can process and/or store the transmitted data.

An XML document contains tags whose organization (i.e., whose relative embedding) establishes an XML tree structure. Each tag corresponds to a type of node in the XML tree called an element, which may have a value specified in connection with the tag. The XML tree structure may also have attribute nodes, each established as the child of an element node and containing a value for an attribute of that element that is specified in connection with the tag. The first-occurring tag corresponds to a node called the root node. The nodes other than the root node each have one parent. A node can be identified by its "Xpath": an ordered recitation of the names of the node and all of its parents, beginning with the root node and ending with the identified node.

BRIEF DESCRIPTION OF THE DRAWINGS

FIG. 7 is a table diagram showing a sample element metadata list generated by the facility in processing the first sample message.

FIG. 9 is a table diagram showing a sample XML_PATH_MAP table generated by the facility in processing the first sample message.

FIGS. 10-14 are table diagrams showing the contents of sample target relational database tables that are created by the facility in processing the first sample message.

FIG. 15 is a table diagram showing the results of applying the query shown in Table 3 while the database is in the condition shown in FIGS. 10-14, i.e., immediately after the first sample message is processed by the facility.

FIG. 16 is a table diagram showing a sample element metadata list generated by the facility in processing the second sample message.

FIG. 18 is a table diagram showing a sample XML_PATH_MAP table generated by the facility in processing the second sample message.

FIGS. 19-25 are table diagrams showing the contents of sample target relational database tables that are created by the facility in processing the second sample message.

FIG. 26 is a table diagram showing the results of applying the query shown in Table 3 while the database is in thy condition shown in FIGS. 19-25, i.e., immediately after the second sample message is processed by the facility.

DETAILED DESCRIPTION

The inventors have recognized that it would be useful to be able to infer the structure of a sequence of XML messages. For example, where access is available to a stream of XML messages formed in accordance with a particular schema but not to a copy of the schema, it would be useful to be able to determine the schema, and store the data contained in the messages in a relational database structured in accordance with the schema. It would be of particular utility to be able to do so where the schema specifies optional elements, values, or attributes, and/or where the schema is modified at a point within the stream of messages.

A software and/or hardware facility for maintaining a relational database and its schema in response to a stream of markup language messages based on one or more arbitrary and evolving schemas ("the facility") is accordingly described. The facility captures XML messages or messages in another markup language flowing from any application, creates or updates a target database schema (tables and columns) based upon structure inferred from the XML messages, creates or updates a target database in accordance with the target schema, and inserts the data in the target database.

Figure 1:
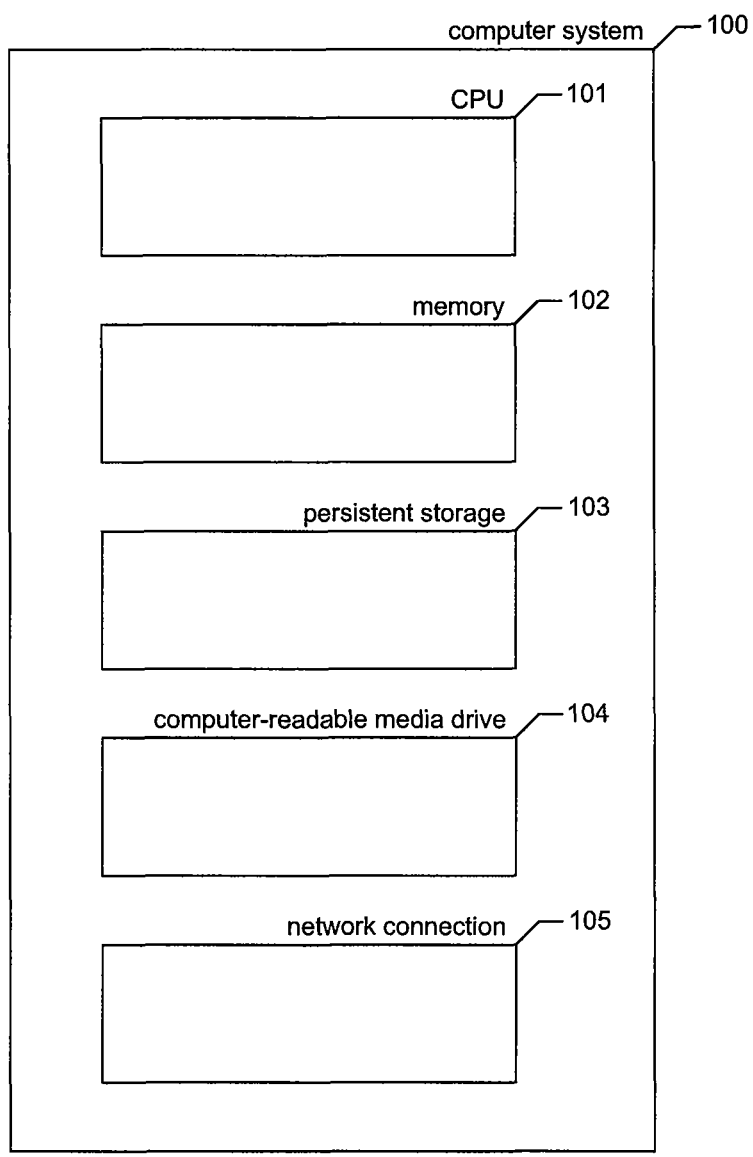
FIG. 1 is a block diagram showing some of the components typically incorporated in at least some of the computer systems and other devices on which the facility executes.

In particular, in generating the target database schema, the facility in some embodiments establishes a table for each element in the XML tree represented by a tag in the messages having a unique Xpath. Each row in such a table represents an occurrence of a tag in a message having the Xpath to which the table corresponds. A table typically has the following columns: a primary key uniquely identifying the element instance to which the row corresponds; a foreign key referencing the primary key of the parent element's table; a column to contain the value—or text—attached to the element instance to which the row corresponds; and columns to contain values of each of the attributes specified for the element instance to which the row corresponds;

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures, database tables, other data tables, etc.—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. In various embodiments, the facility can be accessed by any suitable user interface including Web services calls to suitable APIs. While computer systems configured as described above are typically used to support the operation of the facility, one of ordinary skill in the art will appreciate that the facility may be implemented using devices of various types and configurations, and having various components, such as wireless telephones and similar devices.

FIGS. 2-6 are flow diagrams showing steps typically performed by the facility in some embodiments. An example illustrating the performance of the steps as shown in FIGS. 7-26 and discussed below.

Figure 2:
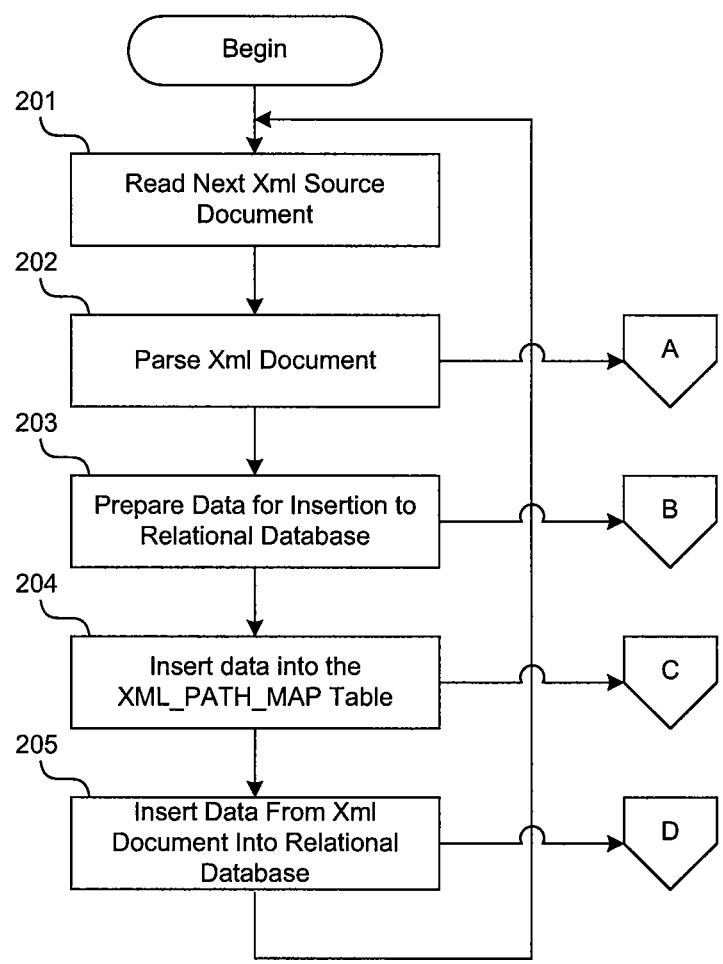
FIGS. 2-6 are flow diagrams showing steps typically performed by the facility to process a stream of XML messages in some embodiments.

FIG. 2 is a flow diagram showing steps typically performed by the facility to process a stream of XML messages in some embodiments. In various embodiments, the stream of XML messages is directed primarily or exclusively to the facility by the application generating the stream of XML messages; secondarily copied to the facility by the generating application; or diverted to or intercepted by the facility without the active involvement of the generating application.

In step 201, the facility reads the next message ("XML source document") of the stream. In some embodiments, if no next message is available when execution reaches step 201, the facility waits at this point until the next message is available. In step 202, the facility parses the structure of the message read in step 201. Additional details of step 202 are shown and discussed below in connection with FIG. 3. In step 203, the facility prepares data from the parsed XML document produced in step 202 for insertion into the target database. Additional details of step 203 are shown and discussed below in connection with FIG. 4. In step 204, the facility inserts the data prepared in step 203 into a XML_PATH_MAP table. Additional details of step 204 are shown and discussed below in connection with FIG. 5. In step 205, the facility inserts the data from the XML document into the target database. Additional details of step 205 are shown and discussed below in connection with FIG. 6. After step 205, the facility continues in step 201 to read the next message.

Figure 3:
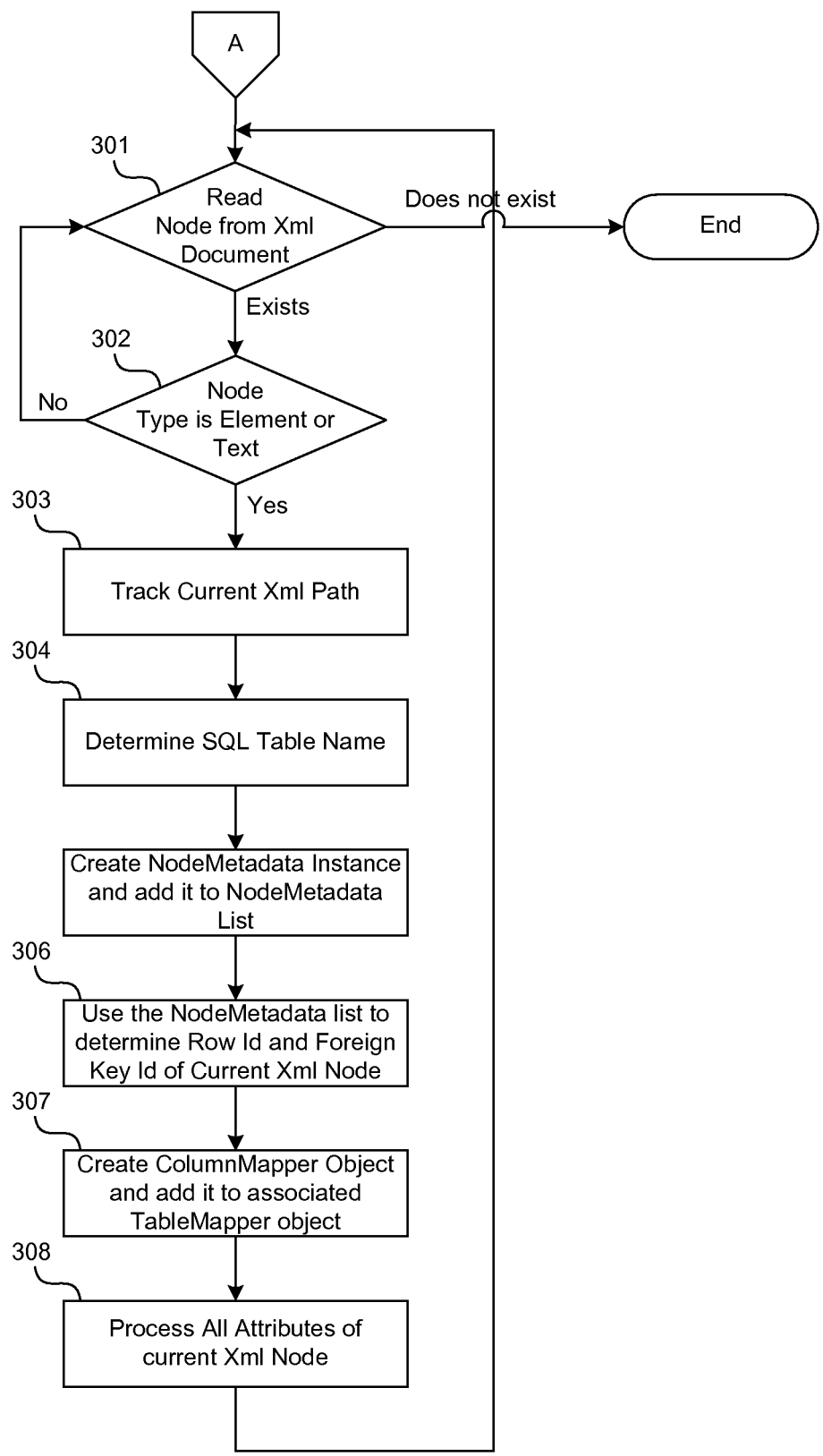

FIG. 3 is a flow diagram showing steps typically performed by the facility in some embodiments as part of step 202. In step 301, the facility attempts to read the next node from the current message, such as by using a tag language parser. If this attempt is successful, the facility continues in step 302, else the steps shown in FIG. 3 conclude and an execution continues in step 203. In step 302, if the node type of the node read in step 301 is element or text, then the facility continues in step 303, else the facility continues in step 301. In step 303, the facility determines the XML path of the node read in step 302, such as by querying the parser used to read the node in step 301. For example, as can be seen from line 1 of sample message #1 shown in Table 1 below, the name of the root node is "Customer." In step 304, the facility determines an SQL table name corresponding to the XML path ("Xpath") determined in step 303. The facility determines whether the Xpath for the current node is mapped to a relational table by the table map data structure maintained by the facility—such as the sample table map data structure shown in Table 2 and FIGS. 8A-8E. In some embodiments, the facility makes this determination using a hash table that hashes from the Xpath for the current node to an entry of the table map data structure for that Xpath. If the Xpath for the current node is not already mapped to a relational table by the table map dictionary, the facility uses the node metadata list to update the table map data structure with a mapping of the Xpath for the current node to a corresponding relational table in the target database by adding a TableMapper object for this relational table to the table map data structure. This involves determining a name for the corresponding relational table. In some embodiments, if the name of the node has not already been assigned to a relational table for a different Xpath, then the facility uses the name of the node. Otherwise, the facility uses a name derived from the name of the node, such as the name of the node followed by one or more extender characters.

In step 306, the facility uses the node metadata list to determine the row ID (e.g., primary key) and foreign key ID of the current node. In step 307, the facility adds to the TableMapper object rows of a column mapper object specifying a new row containing values for the current node, including the determined row ID and foreign key ID. In step 308, the facility processes each attribute value specified for the node. For example, the value of the "Name" element shown in line 2 of Table 1 is "Ken Smith;" the "Txn" node in line 4 of Table 1 specifies the attribute value "12/12/12 01:01:01" for a "TimeStamp" attribute. In step 308, the facility also adds to the TableMapper object a specification of a column for the value or attribute, as well as the value to be contained in the column for the row corresponding to the current element. After step 308, the facility continues in step 301 to attempt to read the next node.

Those skilled in the art will appreciate that the steps shown in FIGS. 2-3 and in each of the flow diagrams discussed below may be altered in a variety of ways. For example, the order of the steps may be rearranged; substeps may be performed in parallel; shown steps may be omitted, or other steps may be included; etc.

Figure 4:
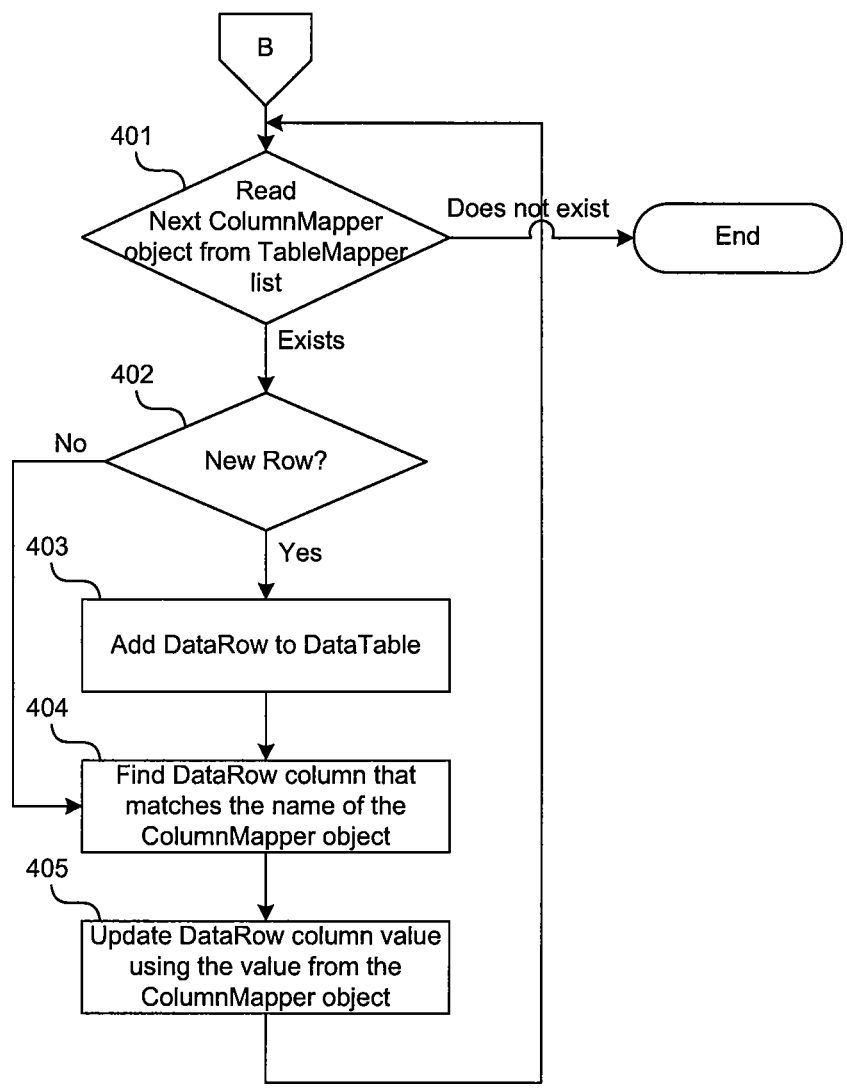

FIG. 4 is a flow diagram showing steps typically performed by the facility in some embodiments as part of step 203. In step 401, the facility attempts to read the next column mapper object from the table map list. If step 401 succeeds, then the facility continues to step 402, else the steps shown in FIG. 4 conclude and execution continues in step 204. In step 402, if the read column mapper object specifies a new row, then the facility continues in step 403, else the facility continues in step 404. In step 403, the facility adds a data row to the data table. In step 404, the facility finds a data row column that matches the name of the column mapper object. In step 405, the facility updates the data row column value using the value obtained from the column mapper object in step 404. After step 405, the facility continues in step 401 to attempt to read the next column mapper object.

Figure 5:
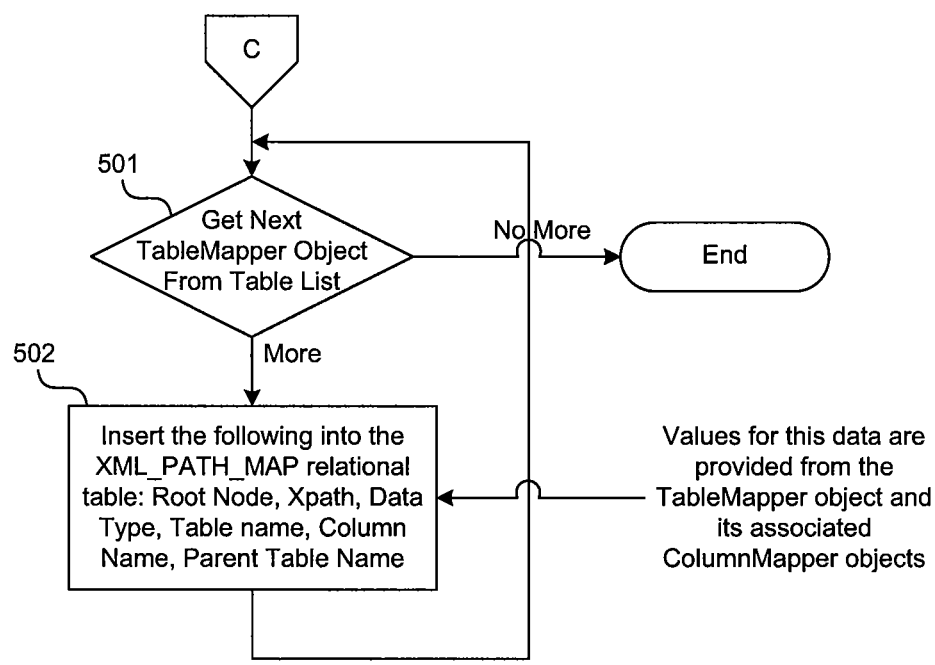

FIG. 5 is a flow diagram showing steps typically performed in the facility in some embodiments as part of step 204. In step 501, the facility attempts to get the next table mapper object from the table list. If step 501 succeeds, the facility continues in step 502, else the steps shown in FIG. 5 conclude and execution continues in step 205. In step 502, the facility inserts the following data into the XML_PATH_MAP relational table: the root node identifier, the Xpath, the data type, the table name, the column name, and the parent table name. These values are obtained from the table mapper object and its associated column mapper objects. After step 502, the facility continues in step 501.

Figure 6:
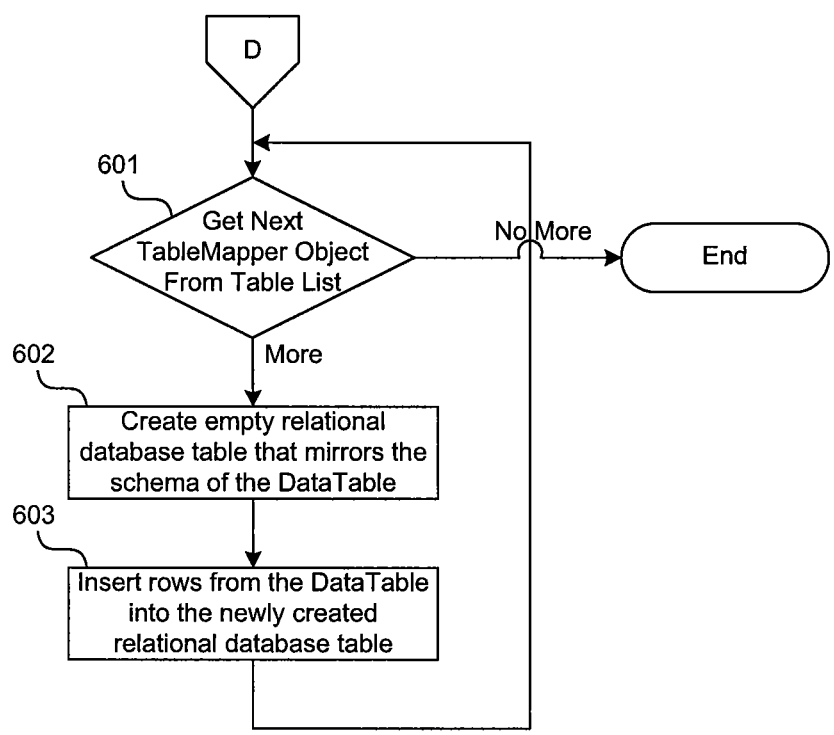

FIG. 6 is a flow diagram showing steps typically performed by the facility in some embodiments as part of step 205. In step 601, the facility attempts to get the next table mapper object from the table list. If step 601 succeeds, then the facility continues in step 602, else the steps shown in FIG. 6 conclude and execution continues in step 201. In step 602, the facility creates an empty relational database table that mirrors the schema of the data table. In step 603, the facility inserts rows from the data table into the relational database table created in step 602. After step 603, the facility continues in step 601 to attempt to get the next table mapper object.

FIGS. 7-26 show an example illustrating the performance of the facility in some embodiments. These figures, together with Tables 2, 3, and 5, show the results of processing two sample messages shown in Tables 1 and 4.

FIGS. 7-15 relate to the facility's processing of the first sample message, which is as follows:

TABLE 1

Sample Message #1

| 1 | <Customer> |
|---|---|
| 2 | <Name>Ken Smith</Name> |
| 3 | <Txns TxnType="Retail"> |
| 4 | <Txn TimeStamp="12/12/12 01:01:01"> |
| 5 | <Txns>Milk</Txns> |
| 6 | <Txns>Cookies</Txns> |
| 7 | </Txn> |
| 8 | </Txns> |
| 9 | </Customer> |

The first sample message has two "Txns" elements on line 5-6, the first having a value of "Milk" and the second having a value of "Cookies". The "Txns" elements are children of a "Txn" element on line 4 having the attribute value "12/12/12 01:01:01" for the attribute "TimeStamp." The "Txn" element is a child of a "Txns" element on line 3 having the attribute value "Retail" for the attribute "TxnType." The "Name" element on line 2 is a sibling of the "Txns" element on line 3, and has value "Ken Smith." The elements on lines 2-3 are children of a "Customer" element, which is the root node in this message.

FIG. 7 is a table diagram showing a sample element metadata list generated by the facility in processing the first sample message. The element metadata list 700 as shown is a table made up of rows 711-716, each of which corresponds to one element in the first sample message and is divided into the following columns: a node ID/row ID column 701 uniquely identifying both the element of the message and the row of the element metadata list table; a depth column 702 indicating the depth of the element in the tree represented by the message; a foreign key ID column 703 containing the element ID/row ID of the row of the node metadata list table corresponding to the parent element; a table name column 704 indicating the name of the element; and a parent table name column 705 indicating the name of the parent element. For example, row 711 corresponds to the "Name" element shown in line 2 of Table 1, this row is uniquely identified by element ID/row ID 2, indicates the depth of the element to be 2, indicates the element's parent to be identified by element ID/row ID number one, indicates an element name of "Name," and indicates a parent element name of "Customer."

While FIG. 7 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Table 2 below shows a TableMap generated by the facility in processing the first sample message.

TABLE 2

Sample TableMap #1

| 1 | Key = /CUSTOMER, Value= CUSTOMER TableMapper Object |
|---|---|
| 2 | Key = /CUSTOMER/NAME, Value= NAME TableMapper Object |
| 3 | Key = /CUSTOMER/TXNS, Value= TXNS TableMapper Object |
| 4 | Key = /CUSTOMER/TXNS/TXN, Value= TXN TableMapper Object |
| 5 | Key = /CUSTOMER/TXNS/TXN/TXNS, Value= TXNS_1 TableMapper Object |

The TableMap contains one row for each unique Xpath encountered in processing the first sample message. Row 1 of Table 2 corresponds to the element in line 1 of Table 1; row 2 of Table 2 corresponds to the element in line 2 of Table 1; row 3 of Table 2 corresponds to the element in line 3 of Table 1; row 4 of Table 2 corresponds to the element in line 4 of Table 1; and row 5 of Table 2 corresponds to the elements in lines 5-6 of Table 1. The TableMap maps from a unique Xpath to a TableMapper object established by the facility for that Xpath. The TableMapper object mapped for a particular Xpath corresponds to a table that has or will be established and the target relational database, and indicates what columns that table must have based upon the read messages, as well as rows that must be added to that table based upon the read messages. In some embodiments, the TableMap includes or has associated with it a hash table used by the facility to efficiently map from an Xpath to the corresponding row of the TableMap.

Figure 8A:
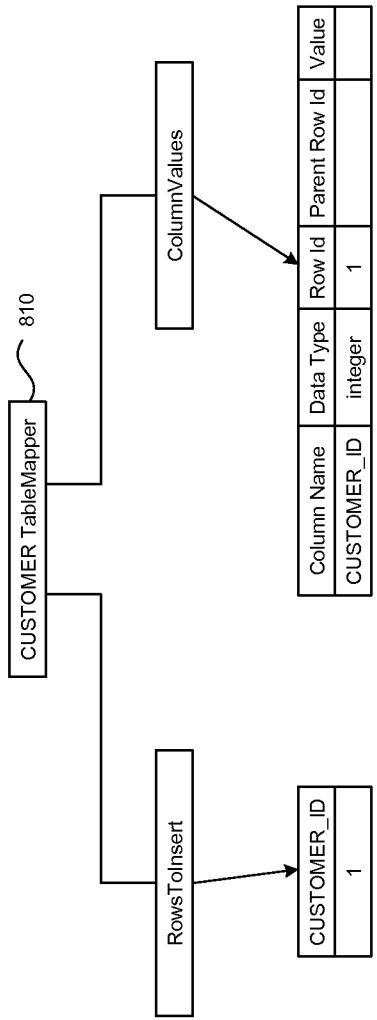
FIGS. 8A-8E are data structure diagrams each showing one of the TableMapper objects contained in the TableMap shown in Table 2.
Figure 8B:
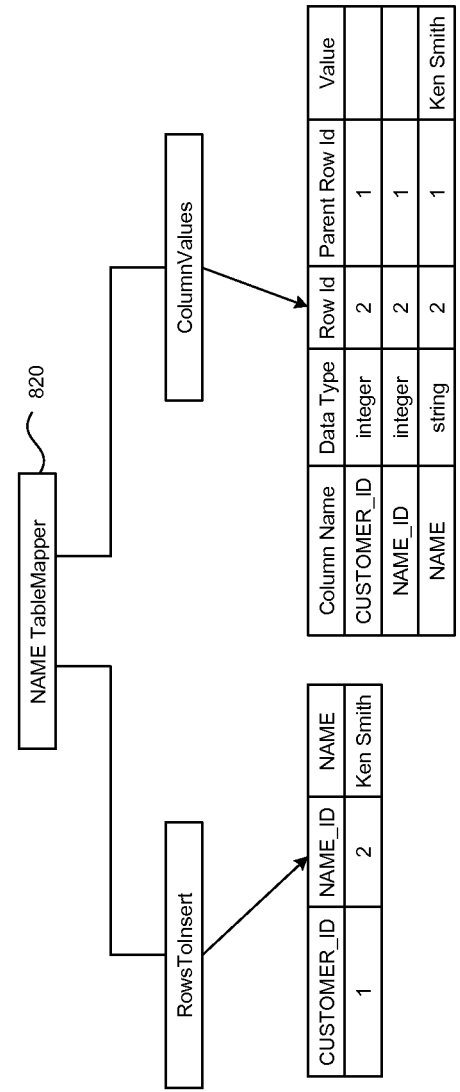
Figure 8C:
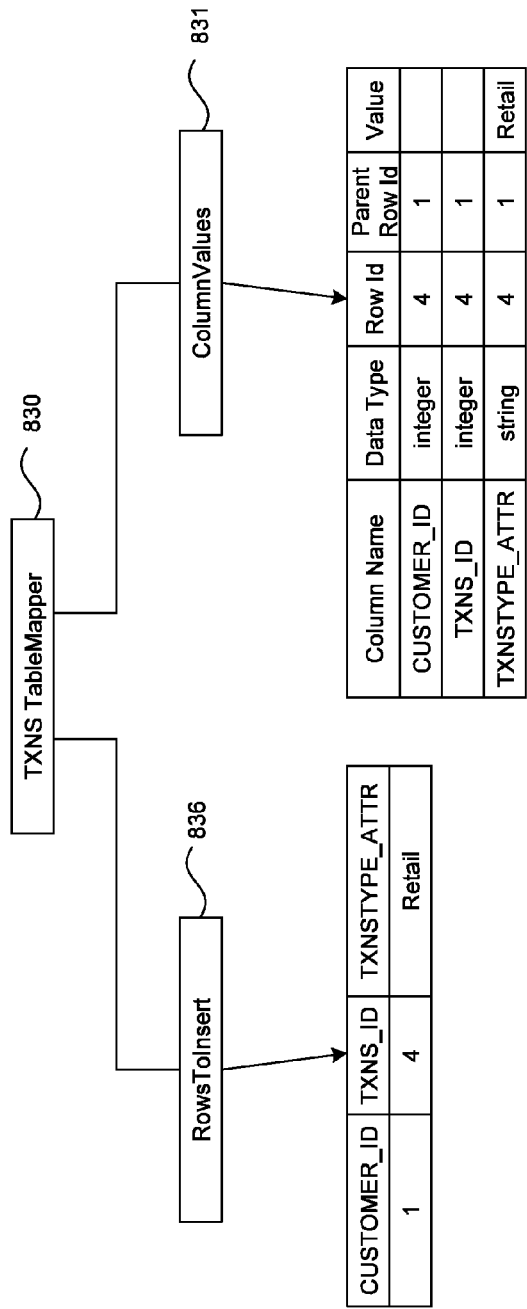
Figure 8D:
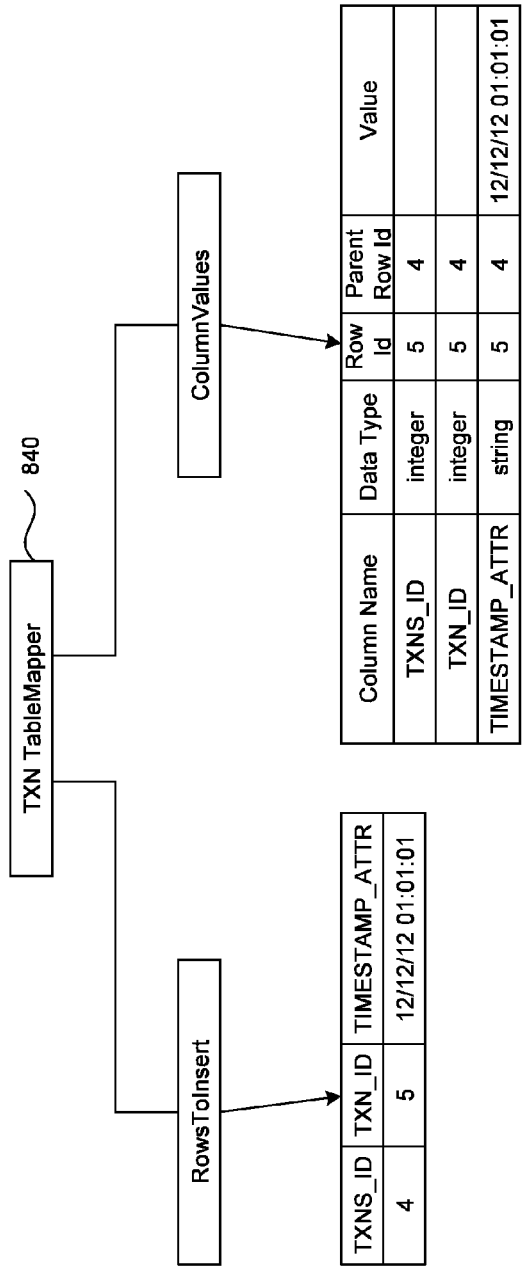
Figure 8E:
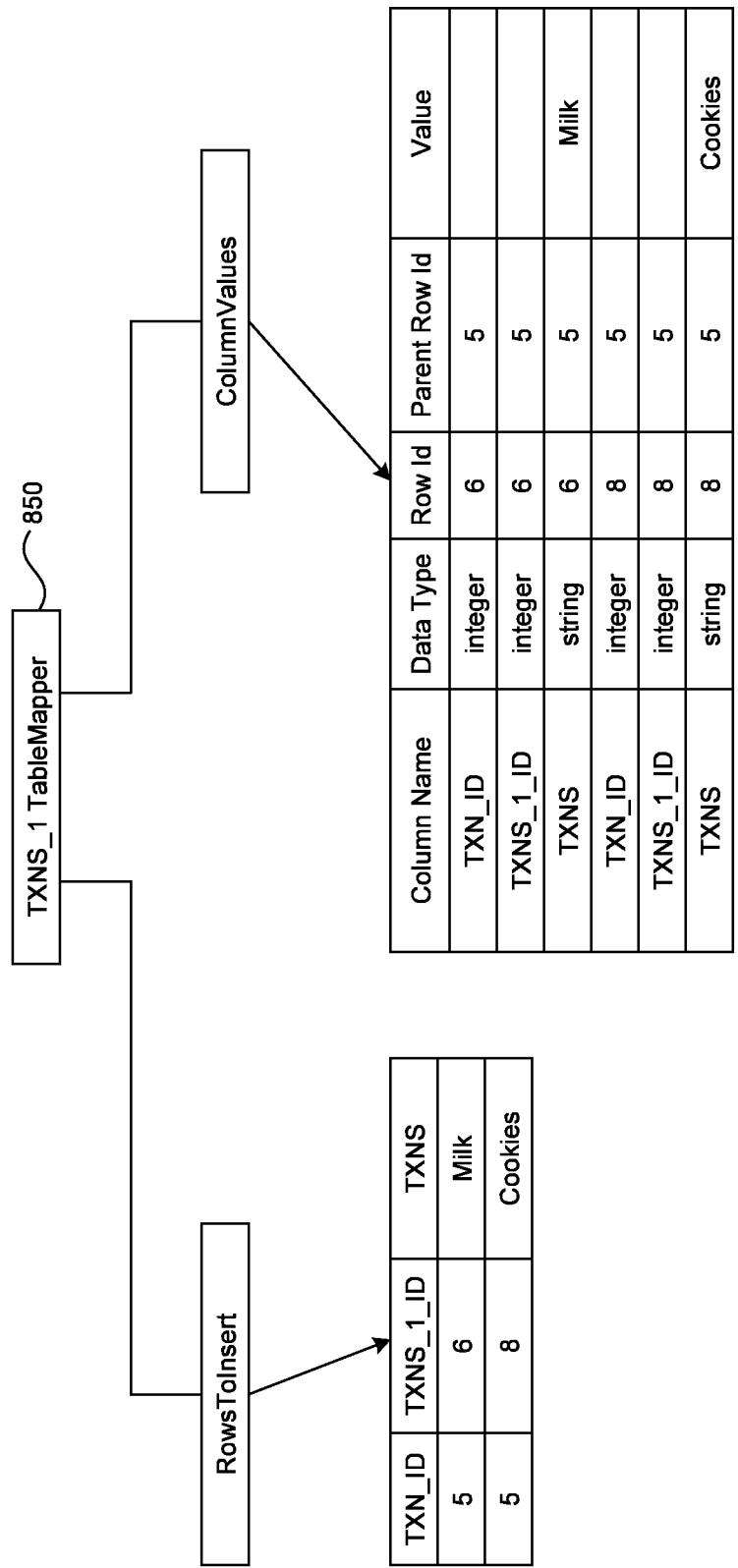

FIGS. 8A-8E are data structure diagrams each showing one of the TableMapper objects contained in the TableMap shown in Table 2. FIG. 8A shows the TableMapper object contained by row 1 of the TableMap representing the CUSTOMER relational table; FIG. 8B shows the TableMapper object contained by row 2 of the TableMap representing the NAME relational table; FIG. 8C shows the TableMapper object contained by row 3 of the TableMap representing the TXNS relational table; FIG. 8D shows the TableMapper object contained by row 4 of the TableMap representing the TXN table; and FIG. 8E shows the TableMapper object contained by row 5 of the TableMap representing the TXNS_1 relational table.

As an example, the TXNS TableMapper object 830 shown in FIG. 8C specifies in a column portion 831 that a TXNS table must be updated to contain the following contents: an empty integer value in a column named "CUSTOMER_ID" in a row having row ID 4; an empty integer value in a column named "TXNS_ID" in a row having row ID 4; and the string value "RETAIL" in a column named "TXNSTYPE_ATTR" in a row having row ID 4. This column portion is later transformed into a row portion 836, which specifies that a row must be added to the TXNS table whose CUSTOMER_ID is 1, whose TXNS_ID is 4, and whose TXNSTYPE_ATTR is "Retail."

FIG. 9 is a table diagram showing a sample XML_PATH_MAP table generated by the facility in processing the first sample message. The XML_PATH_MAP table indicates all of the tables and value or attribute value columns needed in the relational database in order to represent the message as read by the facility. The XML_PATH_MAP table 900 contains rows 911-919 each corresponding to either a table or a column, each of which is divided into the following columns: a table name column 901 containing the name of the needed table; an Xpath column 902 indicating that Xpath that is mapped to the table or column to which the row corresponds; a column name column 903 that, for rows corresponding to columns, indicates the name of the needed column (Rows having a blank column in column correspond to tables); and a parent table name column 904 indicating the name of the table that is the parent of table represented by the current row. For example, rows 914 and 915 relate to the TXNS table, which corresponds to the "Txns" node in line 3 of Table 1. Row 914 represents the table itself, while row 915 represents a column of the table for storing the value of a TXNTYPE attribute.

FIGS. 10-14 are table diagrams showing the contents of sample target relational database tables that are created by the facility in processing the first sample message. FIG. 10 shows the CUSTOMER table 1000 represented by row 911 of the XML_PATH_MAP table and the CUSTOMER TableMapper object 810; FIG. 11 shows the NAME table 1100 represented by rows 912-913 of the XML_PATH_MAP table and the NAME TableMapper object 820; FIG. 12 shows the TXNS table 1200 represented by rows 914-915 of the XML_PATH_MAP table and the TXNS TableMapper object 830; FIG. 13 shows the TXN table 1300 rows 916-917 of the XML_PATH_MAP table and the TXN TableMapper object 840; and FIG. 14 shows the TXNS_1 table 1400 represented by rows 918-919 of the XML_PATH_MAP table and the TXNS_1 TableMapper object 850.

As an example, the TXNS table 1200 shown in FIG. 12 contains the following columns specified by the column portion 831 of the TXNS TableMapper object 830: CUSTOMER_ID, TXNS_ID, and TXNSTYPE_ATTR. The TXNS table 1200 further contains the new row specified by the row portion 836 of the TXNS TableMapper object 830 whose CUSTOMER_ID is 1, whose TXNS_ID is 4, and whose TXNSTYPE_ATTR is "Retail."

Table 3 below contains a sample query that may be performed on the target relational database in order to report on information accumulated from messages read up to any given point. The query seeks to list all /Customer/Txns/Txn/Txns data elements where /Customer/Txns→TxnType="Retail" and /Customer/Txns/Txn/Txns="Cookies."

TABLE 3

Sample Query

1 SELECT Txns_1_ID,Txns
2 FROM Txns_1
3 JOIN Txn on Txns_1.Txn_ID=Txn.Txn_ID
4 JOIN Txns on Txn.Txns_ID = Txns.Txns_ID
5 WHERE Txns.TxnType_Attr = 'Retail'
6 AND Txns_1.Txns = 'Cookies'

FIG. 15 is a table diagram showing the results of applying the query shown in Table 3 while the database is in the condition shown in FIGS. 10-14, i.e., immediately after the first sample message is processed by the facility. The query results table 1500 contains a single row corresponding to row 1412 of the TXNS_1 table shown in FIG. 14, and ultimately to the element on line 6 of Table 1.

FIGS. 16-26 relate to the facility's processing of the second sample message, which is as follows:

TABLE 4

Sample Message #2

| | |
|---|---|
| 1 | <Customer ClubMemberNumber="999"> |
| 2 | <Locations>Address1</Locations> |
| 3 | <Name>Ken Smith</Name> |
| 4 | <Txns TxnType="Wholesale" RegisterNumber="334"> |
| 5 | <Txn TimeStamp="12/12/12 02:01:01"> |
| 6 | <Txns>Beer</Txns> |
| 7 | <Txns> |
| 8 | <Item>Wine</Item> |
| 9 | </Txns> |
| 10 | </Txn> |
| 11 | </Txns> |

TABLE 4-continued

Sample Message #2

| | |
|---|---|
| 12 | <Txns TxnType="Retail" RegisterNumber="334"> |
| 13 | <Txn TimeStamp="12/12/12 02:01:02"> |
| 14 | <Txns>Cookies</Txns> |
| 15 | <Txns> |
| 16 | <Item>Candy</Item> |
| 17 | <Txns> |
| 18 | </Txn> |
| 19 | </Txns> |
| 20 | </Customer> |

FIG. 16 is a table diagram showing a sample element metadata list generated by the facility in processing the second sample message. It can be seen that rows 1611-1616 correspond to rows 711-716 in the earlier version of the node metadata list shown in FIG. 7. Rows 1617-1629, on the other hand, are added by the facility in processing the second sample message.

Table 5 below shows a TableMap generated by the facility in processing the second sample message.

TABLE 5

Sample TableMap #2

1 Key = /CUSTOMER, Value= CUSTOMER TableMapper Object
2 Key = /CUSTOMER/NAME, Value= NAME TableMapper Object
3 Key = /CUSTOMER/TXNS, Value= TXNS TableMapper Object
4 Key = /CUSTOMER/TXNS/TXN, Value= TXN TableMapper Object
5 Key = /CUSTOMER/TXNS/TXN/TXNS, Value= TXNS_1 TableMapper Object
6 Key = /CUSTOMER/LOCATIONS, Value= LOCATIONS TableMapper Object
7 Key = /CUSTOMER/TXNS/TXN/TXNS/ITEM, Value= ITEM TableMapper Object By comparison to Table 2, it can be seen that rows 6 and 7 have been added in processing the second sample message.

Figure 17A:
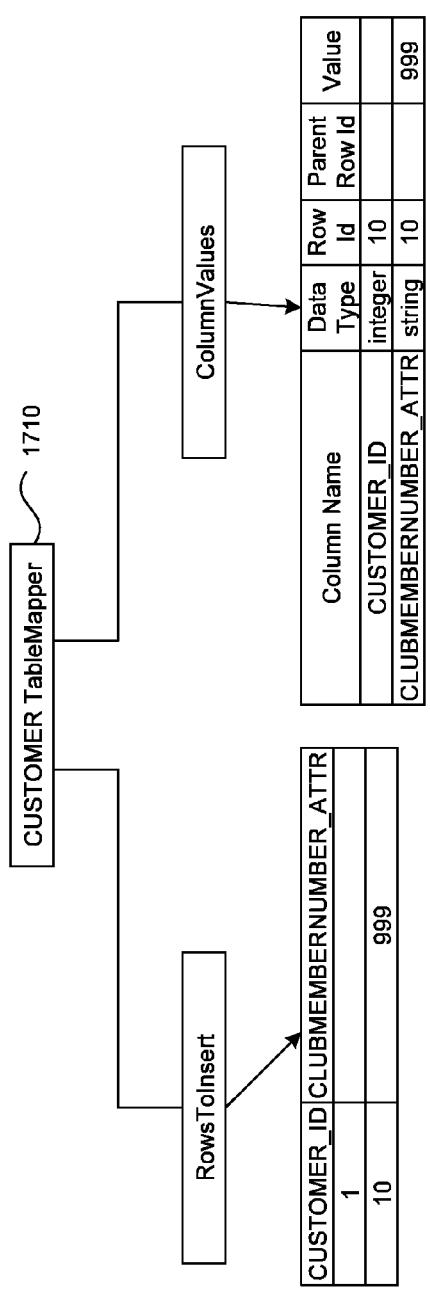
FIGS. 17A-17G are data structure diagrams each showing one of the TableMapper objects contained in the TableMap shown in Table 5.
Figure 17B:
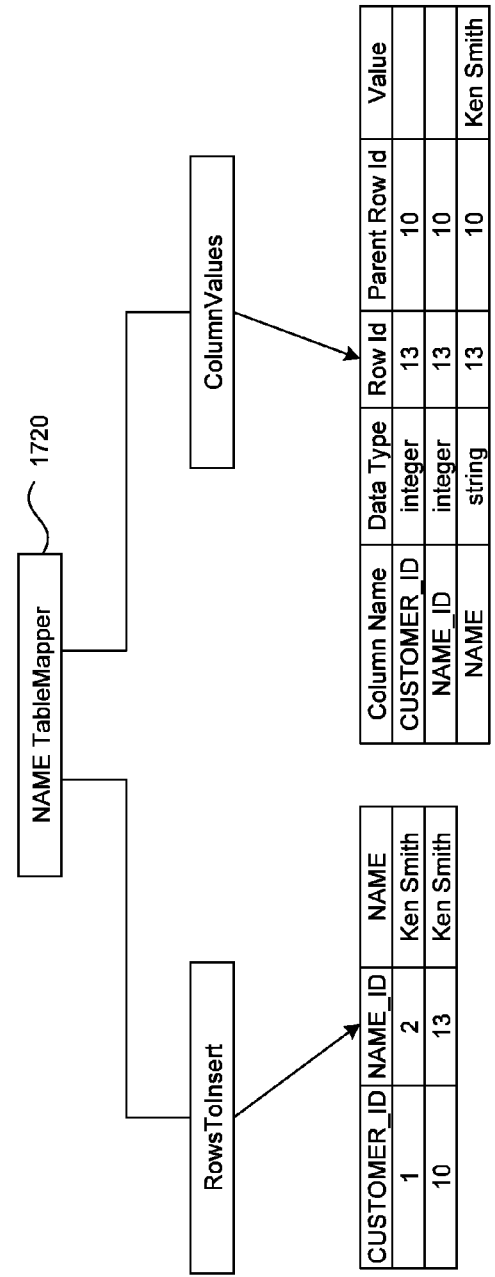
Figure 17C:
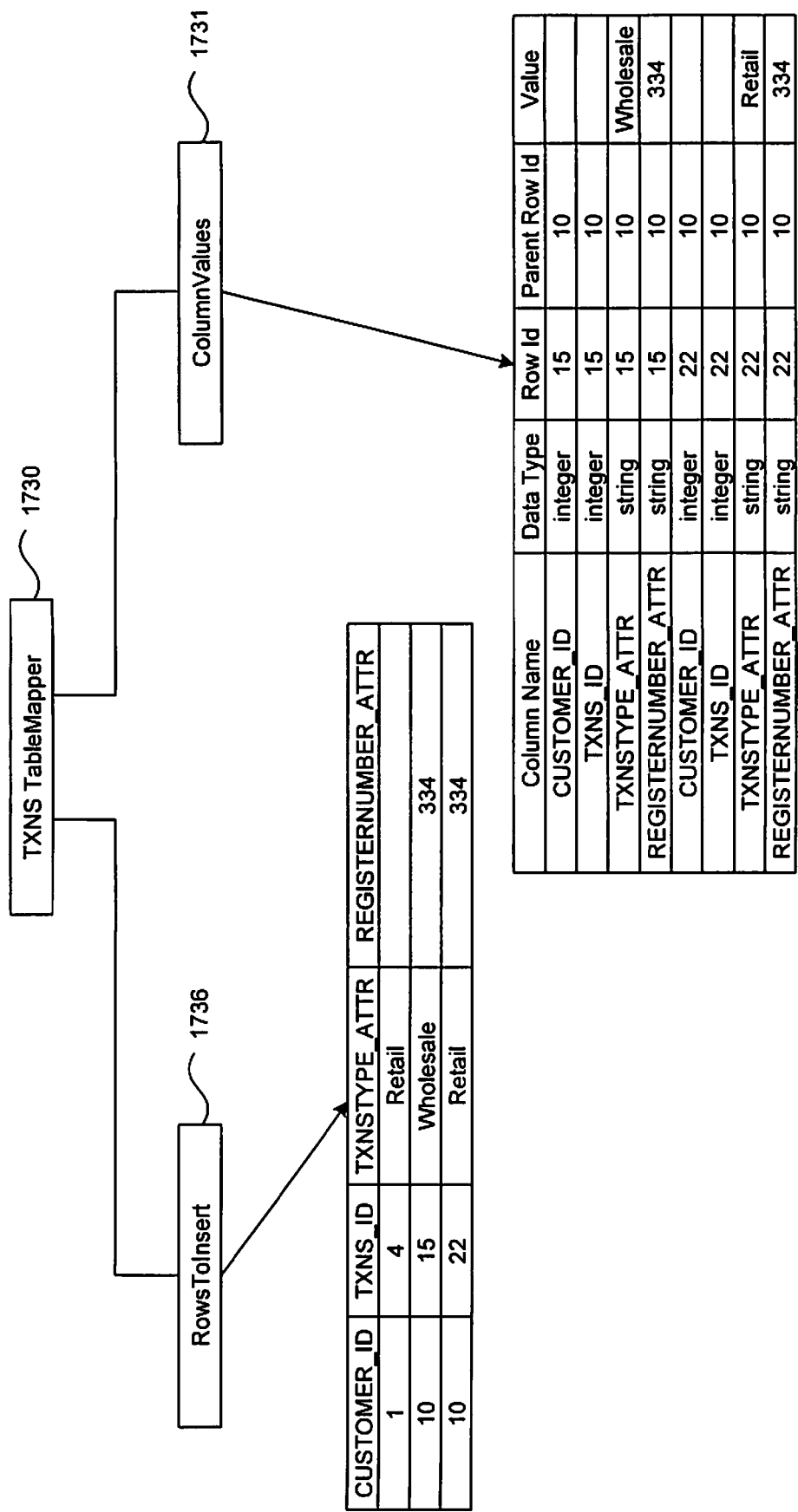
Figure 17D:
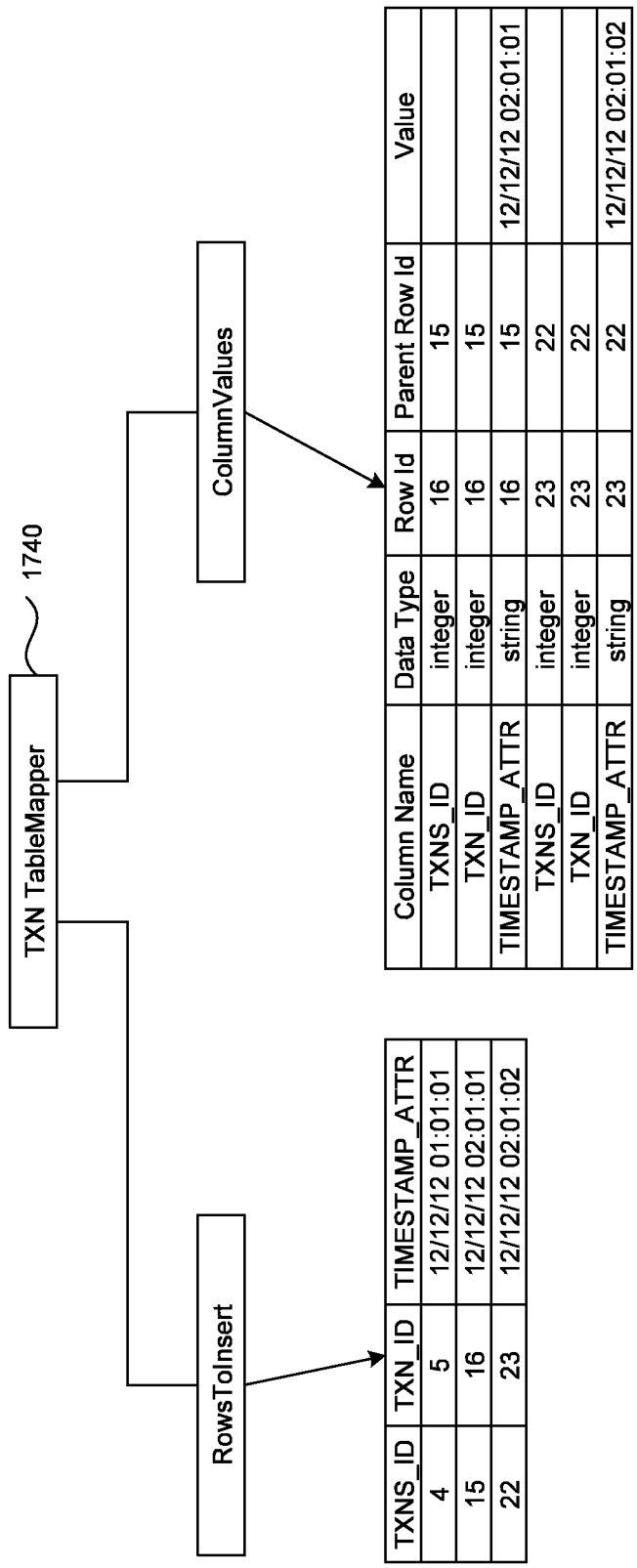
Figure 17E:
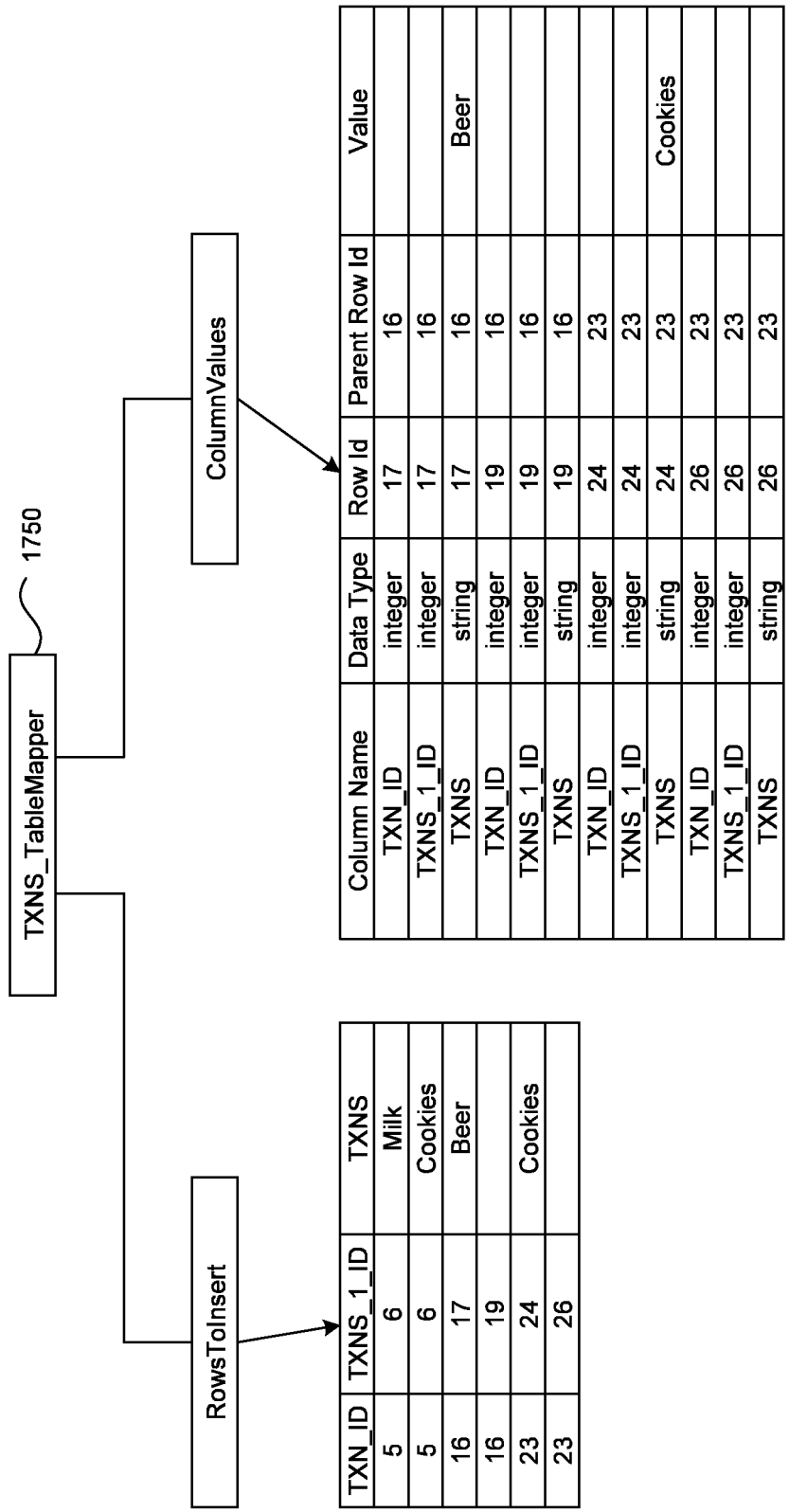
Figure 17F:
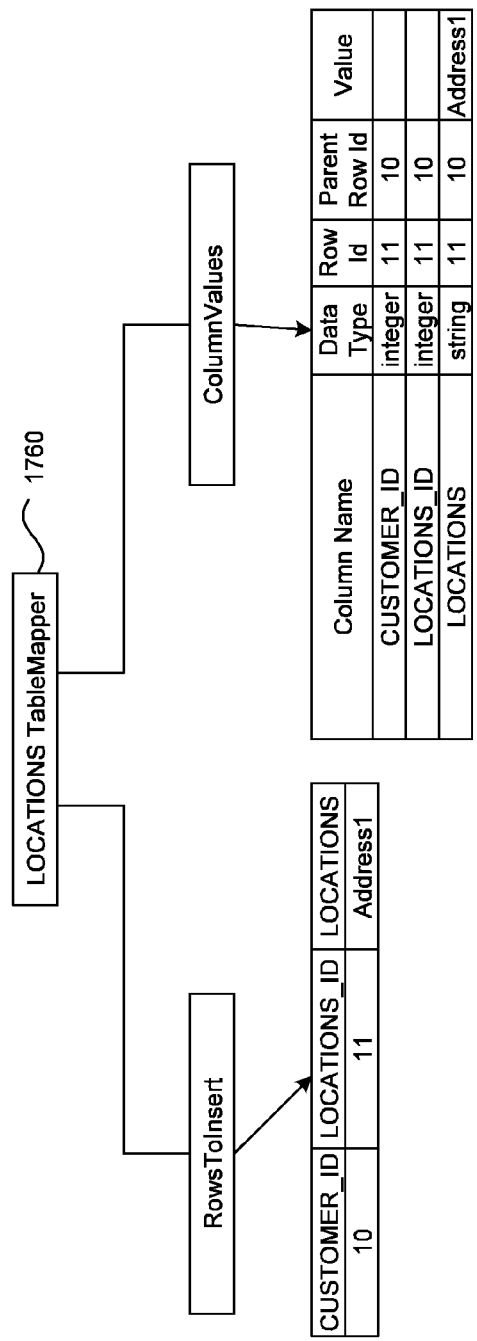
Figure 17G:
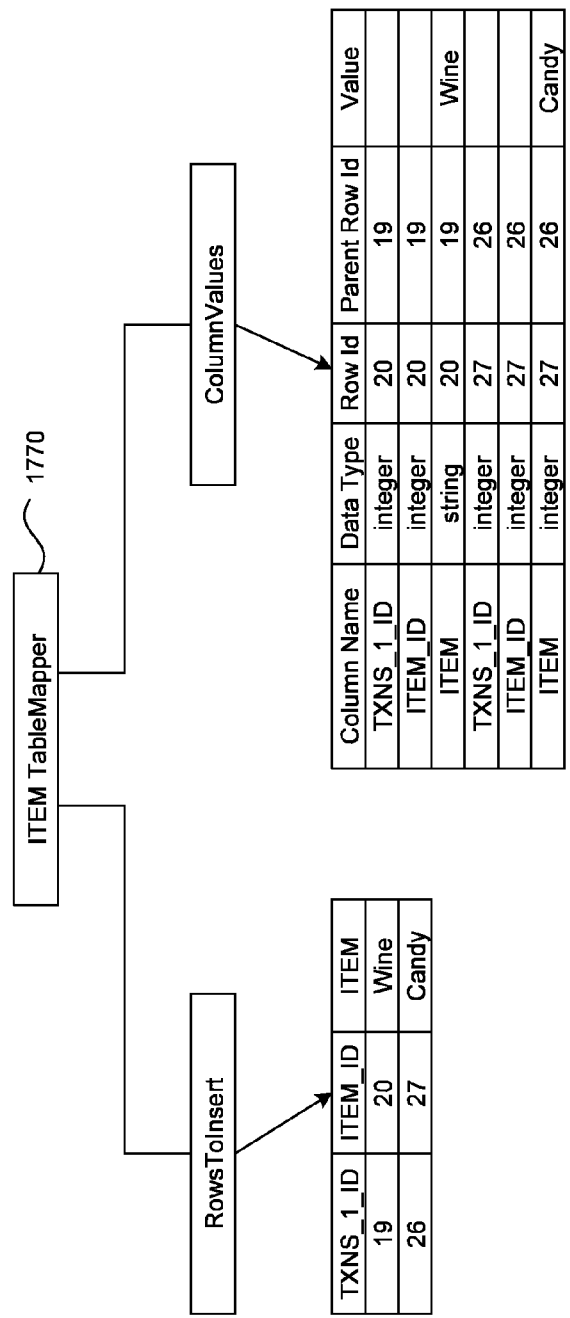

FIGS. 17A-17G are data structure diagrams each showing one of the TableMapper objects contained in the TableMap shown in Table 5. FIG. 17A shows the TableMapper object contained by row 1 of the TableMap representing the CUSTOMER relational table; FIG. 17B shows the TableMapper object contained by row 2 of the TableMap representing the NAME relational table; FIG. 17C shows the TableMapper object contained by row 3 of the TableMap representing the TXNS relational table; FIG. 17D shows the TableMapper object contained by row 4 of the TableMap representing the TXN relational table; FIG. 17E shows the TableMapper object contained by row 5 of the TableMap representing the TXNS_1 relational table; FIG. 17F shows the TableMapper object contained by row 6 of the TableMap representing the LOCATIONS relational table; and FIG. 17G shows the TableMapper object contained by row 7 of the TableMap representing the ITEM relational table.

By comparing the TXNS TableMapper object 1730 shown in FIG. 17C to the TXNS TableMapper object 830 shown in FIG. 8C, it can be seen that the facility has added to the column portion 1731 additional contents for a REGISTERNUMBER attribute based upon the elements in lines 4 and 12 of Table 4. It can also be seen that the facility is added to the rows portion 1736 of the TXNS TableMapper object 1730 new row specifications corresponding to the elements in lines 4 and 12 of Table 4.

FIG. 18 is a table diagram showing a sample XML_PATH_MAP table generated by the facility in processing the second sample message. By comparing the XML_PATH_MAP table 1800 shown in FIG. 18 to the XML_PATH_MAP table 900 shown in FIG. 9, it can be seen that the facility has added the following rows in processing the second sample message: row 1812, specifying a column for a new CLUBMEMBER-NUMBER attribute appearing in line 1 of Table 4; row 1817 specifying a for a new REGISTERNUMBER attribute appearing in line 4 of Table 4; row 1822, specifying a new LOCATIONS table for the LOCATIONS node attribute appearing in line 2 of Table 4; row 1823, specifying a new LOCATIONS column for the new LOCATIONS table; row 1824, specifying a new ITEM table for the ITEM node attribute appearing in line 8 of Table 4; and row 1825, specifying a new ITEM column for the new ITEM table.

FIGS. 19-25 are table diagrams showing the contents of sample target relational database tables that are created by the facility in processing the second sample message. FIG. 19 shows the CUSTOMER table 1900 corresponding to rows 1811-1812 of the XML_PATH_MAP table and the CUSTOMER TableMapper object 1710; FIG. 20 shows the LOCATIONS table 2000 corresponding to rows 1822-1823 of the XML_PATH_MAP table and the LOCATIONS TableMapper object 1760; FIG. 21 shows the NAME table 2100 corresponding to rows 1813-1814 of the XML_PATH_MAP table and the NAME TableMapper object 1720; FIG. 22 shows the TXNS table 2200 corresponding to rows 1815-1817 of the XML_PATH_MAP table and the TXNS TableMapper object 1730; FIG. 23 shows the TXN table 2300 corresponding to rows 1818-1819 of the XML_PATH_MAP table and the TXN TableMapper object 1740; FIG. 24 shows the TXNS_1 table 2400 corresponding to rows 1820-1821 of the XML_PATH_MAP table and the TXNS_1 TableMapper object 1750; and FIG. 25 shows the ITEM table 2500 corresponding to rows 1824-1825 of the XML_PATH_MAP table and the ITEM TableMapper object 1770.

As an example, by comparing the TXNS table 2200 shown in FIG. 22 to the TXNS table 1200 shown in FIG. 12, it can be seen that, in processing the second sample message, the facility has added column 2204 to contain values of the new REGISTERNUMBER attribute of the /CUSTOMER/TXNS element. The facility has also added rows 2212-2213, corresponding to the occurrences of the /CUSTOMER/TXNS element in lines 4 and 12 of Table 4.

FIG. 26 is a table diagram showing the results of applying the query shown in Table 3 while the database is in the condition shown in FIGS. 19-25, i.e., immediately after the second sample message is processed by the facility. By comparing the query results table 2600 shown in FIG. 26 to the query results table 1500 shown in FIG. 15, it can be seen that a second row 2612 has been added to the result, corresponding to row 2415 of the TXNS_1 table shown in FIG. 24, and ultimately to the element on line 14 of Table 4.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:
1. A method in a computing system for representing in a relational database informational content of a stream of XML messages, at least two of the XML messages having different hierarchical formats, comprising:
from each XML message of the stream, reading a plurality of open tags each corresponding to an element in the corresponding XML message;
for each read open tag, automatically determining a path from a root node corresponding to a first read open tag from the corresponding XML message to the currently read open tag;
for each determined path:
(a) automatically designating a relational table in the relational database corresponding to the path, and
(b) storing a combination of at least one of a first identifier for the currently read open tag corresponding to the path, the first identifier being stored in connection with information identifying a primary key column of the designated relational table corresponding to a primary key for the designated relational table,
and a second identifier of a parent of the currently read open tag, the parent comprising the open tag immediately preceding the currently read open tag in the determined path, the second identifier being stored in connection with information identifying a foreign key column of the designated relational table corresponding to a foreign key of the designated relational table;
for each read open tag having at least one of a value or an attribute value:
(c) designating at least one data column different from the primary and foreign key columns of the relational table corresponding to the determined path for the read open tag, the at least one data column corresponding to the at least one of the value or the attribute value, and
(d) storing information identifying the at least one designated data column of the relational table in connection with the stored combination of the first identifier and the second identifier for the read open tag; and
after reading open tags associated with XML messages comprising hierarchical formats not previously encountered and not previously associated with at least one of created relational tables or created columns of relational tables:
automatically creating at least one of relational tables or columns of relational tables in accordance with steps (a) thru (d) above, and
when a currently read open tag corresponds to an existing combination of a first and second identifier,
creating a new row in the designated relational table associated with the combination of the first identifier and the second identifier, the row containing the first identifier stored in the primary key column of the associated relational table and the second identifier stored in the foreign key column of the associated relational table, and
for each value or attribute value of the currently read open tag associated with the existing combination of the first identifier and the second identifier, writing the value or attribute value to the at least one corresponding data column of the new row of the associated relational table.

2. The method of claim 1 wherein each read open tag has a name, and wherein designating the relational table corresponding to the path comprises determining a relational table name based on a name of the deepest element of the path.

3. The method of claim 2 wherein determining the relational table name based on the name of the deepest element of the path comprises:
in response to the relational table name having previously been designated for the path, designating the relational table name previously designated for the path; and
in response to the relational table name having not previously been designated for the path:

in response to the relational table name being equal to a name of the open tag corresponding to the deepest element of the path that has not been previously designated for any path, designating the relational table name equal to the name of the open tag corresponding to the deepest element of the path; and in response to the relational table name being equal to the name of the open tag corresponding to the deepest element of the path that has been previously designated for any path, designating the relational table name based on the name of the open tag corresponding to the deepest element of the path but not equal to any relational table name designated for any path.

4. The method of claim 1 wherein designating the relational table corresponding to the path comprises accessing a resource hashed on the path to determine if a relational table name has previously been designated for the path.

5. A computer-readable medium whose contents are configured for causing a computing system to perform a method for representing in a relational database informational content of a stream of tag-language messages, in which at least two of the tag-language messages have different hierarchical formats, the method comprising:

from each message of the stream, reading a plurality of open tags each corresponding to an element in the corresponding message;

for each read open tag, automatically determining a path from a root node corresponding to a first read open tag from the corresponding message to the currently read open tag;

for each determined path, automatically designating a relational table in the relational database corresponding to the path;

for each read open tag having at least one of a value or an attribute value:

designating at least one data column of the relational table designated for the path determined for the read open tag, the at least one data column corresponding to the at least one of the value or the attribute value, and storing information identifying the at least one designated data column of the relational table; and after reading open tags associated with tag-language messages comprising hierarchical formats not previously encountered and not previously associated with at least one of created relational tables or created columns of relational tables:

automatically creating at least one of relational tables or columns of relational tables, and for each value or attribute value, writing the value or attribute value to the at least one designated data column of a new row of the relational table based on the information identifying the at least one designated data column.

* * * * *